3,080,278
ALKYLATED NAPHTHALENE FUNGAL GROWTH INHIBITORS

John D. Douros, Jr., West Chester, Pa., Richard L. Raymond, Wilmington, Del., and John J. Melchiore, Wallingford, Pa., assignors to Sun Oil Company, Philadelphia, Pa., a corporation of New Jersey
No Drawing. Filed Jan. 22, 1962, Ser. No. 167,974
20 Claims. (Cl. 167—32)

This invention relates to certain alkylated aromatics which inhibit the growth of fungi and yeasts and mildew causative organisms.

More particularly this invention concerns mono- and dialkylated fungal inhibitors useful in protecting materials subject to fungal attack for extended periods of time. These fungal growth inhibitors are selected from the group of alkylnaphthalenes consisting of 1,8-dialkylnaphthalenes, 1,2-dialkylnaphthalenes, 1-ethylnaphthalene, and mixtures thereof.

As used throughout this disclosure, alkyl and dialkyl are understood to be those radicals each having at least 1 and no more than 6 carbon atoms, branched or unbranched, joined or conjoined.

Illustrative examples of the inhibitors of this invention are the 1,2- and 1,8-dimethyl-, diethyl-, dipropyl-, dibutyl-, diamyl-, and dihexylnaphthalenes, and 1-ethylnaphthalene.

While all of the above compositions inhibit the growth of fungi and yeasts a variety of considerations determines whether any member or members of the group are favored over the group as a whole. In this instance, because of their low costs and availability as a by-product from hydrocarbon cracking processes, the unresolved isomeric mixtures containing fungistatic concentrations of 1,8- and 1,2-dimethyl and diethylnaphthalenes, as well as the other mono- and polyalkyl isomers are favored inhibitors of this invention.

Within this favored group of inhibitors the specific 1-8-dimethyl and 1,8-diethylnaphthalenes represent the preferred embodiments of this invention.

While there is no dearth of fungal inhibitors existing today, few of the commercially available inhibitors offer the advantage of being low in cost, readily available, and have activity against a broad spectrum of fungi and yeasts for extended periods of time.

The applicants have found that the enumerated alkyl and dialkylnaphthalenes are potent fungal and yeast growth inhibitors at economically low concentrations and are available as low cost refinery by-products.

That these inhibitor compositions are active at all is most surprising in view of the inactivity of the isomeric 1,7-, 1,5-, 1,4- 1,3- 2,6- 2,3- 2,7-dialkylnaphthalenes as well as the homologous 2-methylnaphthalene at the same concentration levels and under the same test conditions. The fungal and yeast inhibitors of this invention are advantageous in that they may be used to treat a wide variety of plant life to prevent fungal attack. By plant life is meant those materials including living plants, tubers, seeds, bushes, vegetables, and trees and the like. In addition, these inhibitors may be incorporated in paints, coatings, films, and polymers to protect inanimate materials such as fibers, plasticizers, plastics, wood, wood composition products, cutting oils, adhesives and the like. It has been estimated that losses from spoilage, decay, and corrosion resulting from fungal attack annually run into millions of dollars.

One of the areas of the economy where fungal and yeast attack is especially damaging is in agriculture. Particularly prone to rot caused by fungi are various crops of commercial importance such as tomatoes, melons, corn, peanuts, cucumber, bananas, and the like. These losses occur both during growth and after harvest in storage and transit. For example, the following fungi genera are causative factors in the diseases or infections listed:

| Microorganisms Genus | Crop and Infection | Percent Loss of Crop |
|---|---|---|
| Alternaria | Tomato spot<br>Cantaloupe rot<br>Carrot blight<br>Cotton leaf spot | 3-4%. |
| Fusarium | Banana rot | May go as high as 90% of shipment. |
| | Corn, sweet potato and potato rot. | 10% of crop after harvest. |
| Aspergillus | Corn seedling infection<br>Apple rot | Considerable. |
| Rhizopus | Sugar Beet rot<br>Peanut disease | Do. |

As can readily be seen, there is a real need for fungal growth inhibitors to control the causative fungi.

The applicants have found that when the inhibitors of the invention are applied to many crops during growth and after harvest, the growth of several of the fungi which are the causative factors in these losses can be substantially arrested. Particularly noteworthy is the finding that the applicants' compositions are effective in reducing the loss of fruit caused by Fusarium roseum (banana rot) in stored bananas. The control of this fungal infection is of significant commercial importance.

A second area of use where the fungal growth inhibitors are useful is in the formulation of paints, films, and coatings and the like used to protect materials from rot. This rot of materials is caused by the attack of microorganisms, particularly fungi, under favorable environmental conditions of high heat and humidity. The problem is especially acute in permanent installations such as missile and air bases located in the tropics or subtropics. After exposure to constant high heat and humidity, plastics, paints, coatings and the like are especially vulnerable to fungally induced rot. By incorporating the fungal inhibitors of this invention into the formulation of materials subject to fungal attack, these costly losses can be greatly reduced. In polymer, coatings and films, the fungal inhibitors are added to the components or the plasticizer preferably before polymerization.

Similarly, many fibers under favorable environmental conditions of high heat and humidity are readily attacked by fungi. These include the genera: Chaetomium, Aspergillus, Penicillium, Fusarium, as well as many unidentified fungi and yeasts and other microorganisms. This rot which results from the microorganism attack is popularly referred to as mildew. After the causative microorganism has fed upon the fiber substrate, the tensile strength of the fiber is greatly weakened and it has a much "shorter life" expectancy. It has been found that by incorporating small amonuts of the fungal inhibiting compositions into the fiber or the fiber finish, the severity and likelihood of mildew rot can be lessened. In synthetic fibers the practice is to add the fungal inhibiting composition to the fiber precursor, prior to polymerization. In natural fibers the inhibitors are generally added to the finishing solutions, before or after the cloth is woven. In this way more resistant fibers such as the nylons, acrylics, cotton, wool, silk, linens, and the like can be produced.

An additional advantage of the fungal inhibitors particularly for use in agricultural products or for use in coatings, paints, and polymers is their low cost and ease of formulation. For example, the inventive compositions are obtained as inexpensive isomer mixtures produced during the catalytic cracking of gas oil. For agricultural use or in paints, coatings, and the like, the unresolved isomer mixtures containing an inhibiting amount of active isomers can be used without costly separation procedures. On the other hand, for special uses it may be desirable to formulate the inhibitors with a specific desired isomer. For reasons presently unclear, these mixtures of active and inactive isomers appear to have greater inhibitory activity in some instances than the individual active isomers acting alone.

An ancillary but important advantage of these fungicides especially in agricultural use is that they can be made up as solid or liquid formulations. Examples of solid formulations are dusts, wettable powders, granules and pellets. Each of these may contain one or more of the specified isomers or an unresolved mixture of the isomers combined with a solid carrier or extender, ordinarily a non-reacting or inert substance such as sand, clays, talcs, sawdust, flours, alkaline earth carbonates, oxides, phosphates, and the like as well as diatomaceous earths, micas, or similar suitable materials.

Where liquid formulations are desirable, liquid extenders, diluents, or carriers of a non-reactive nature are utilized. Examples of such materials are aliphatic alcohols, chlorocarbons, ketones and glycols, aromatic hydrocarbons, petroleum fractions and distillates among many others.

Where it is desired to use the aforementioned wettable powders, or liquid formulations either emulsified, dispersed or suspended in water or other fluid, one or more of a class of materials herein referred to as adjuvants can be incorporated into the powder, dust, or liquid formulation. These adjuvants comprise surface active agents, detergents, wetting agents, solubilizing agents, stabilizers, dispersing agents, suspending agents, emulsifying agents, spreaders, stickers, and conditioning agents generally. Through their modifying characteristics, these adjuvants facilitate handling and application, and not infrequently, enhance or potentiate the compositions of this invention in their inhibitory activity by mechanisms frequently not well understood.

A satisfactory but not exhaustive list of these adjuvants appears among other places in "Soap and Chemical Specialties," volume 31, No. 7, page 61; No. 8, pages 48–61; No. 9, pages 52–67; and No. 10, pages 38–67 (1955). Also see Bulletin #607 of the Bureau of Entomology and Plant Quarantine of the United States Department of Agriculture.

An additional advantage of the invention compositions is their compatibility with a variety of biocidal materials. For example, it may frequently be convenient to combine one or more compositions of this invention with one or more adjuvants and carriers with pesticides and biocides of various structures. For example, one or more of the isomeric fungicidal inhibitors or an unresolved isomeric mixture of these inhibitors may be combined with insecticidal materials such as chlorodane, benzene hexachlorides, DDT, DDD, the insecticidal carbamates, polychlorinated terpenes, the parathions, methoxychlor, insecticidal phosphates, phosphorothioates, and phosphorodithioates, with fungicides such as sulfur, quinones, dodecylgaunidine, the metal dimethyldithiocarbamates, N - trihalomethylthio - 4 - chlorohexene - 1,2 - dicarboximide, N-(tri-chloromethylthio) phthalimide, heptadecylimidazoline, dinitrocapryl crotonate, and various fungicidal zinc, iron, nickel, manganese, copper, lead, and mercury salts.

The lower dialkylnaphthalenes such as the dimethyl- and diethylnaphthalenes are well known compounds described in the literature such as Chemical Abstracts or in the exhaustive review by Donaldson, entitled "The Chemistry and Technology of Naphthalene Compounds," published by E. Arnold, 1958. The higher dialkylnaphthalenes can be made by analagous alkylation procedures well known in synthetic organic chemistry.

More detailed illustrative examples of this invention are given in the examples which follow.

EXAMPLE I.—DETERMINING ANTI-FUNGAL ACTIVITY OF REPRESENTATIVE COMPOUNDS OF THIS INVENTION AGAINST TEST ORGANISMS

*Experimental*

The following viable test fungi are treated as described below:

*Fusarium oxysporum*
*Fusarium roseum*
*Rhizopus nigricans*
*Rhizopus stolonifer*
*Aspergillus niger*
*Alternaria solani*

One loopful of each of the above viable fungi cultures, spores and mycelia is transferred from an agar slant to an 80 ml. portion of the nutrient broth given below.

| Component: | Percentage by wt. |
|---|---|
| Bacto-soytone | 1.0 |
| Bacto-dextrose | 4.0 |
| Deionized water to volume. | |

The 80 ml. portion of the fungi and broth is placed on a sterile trypsinizing flask (300 ml.) and the flask is placed on a rotary shaker for 72 hours at room temperature. At the end of this incubation time period, 20 ml. of the liquid are homogenized and placed into another sterile trypsinizing flask (300 ml.) containing 90 ml. of the above nutrient broth and 60 p.p.m. of the inhibitor being evaluated. The flasks are placed on a rotary shaker operating at 240 r.p.m. at room temperature for three days. After this second incubation time the flasks are taken off and examined for visible fungal growth. Untreated controls are used as the basis of comparison.

*Results*

The following chemicals gave substantially complete inhibition of fungal growth at 60 p.p.m.:

1,2-dimethylnaphthalene
1,2-diethylnaphthalene
1,8-dimethylnaphthalene
1,8-diethylnaphthalene The following isomers of the above listed active alkylnaphthalenes are completely inactive at 60 p.p.m. in inhibiting the growth of the same fungi under the same test and control conditions:

1,3-dimethylnaphthalene
1,4-dimethylnaphthalene
1,5-dimethylnaphthalene
1,6-dimethylnaphthalene
1,7-dimethylnaphthalene
2,6-dimethylnaphthalene
2,3-dimethylnaphthalene
2,7-dimethylnaphthalene
1-methylnaphthalene
2-methylnaphthalene
2-ethylnaphthalene EXAMPLE II.—ANTI-FUNGAL ACTIVITY OF REPRESENTATIVE COMPOUNDS OF THIS INVENTION AGAINST *Alternari Solani*

The following compositions are made up as 0.2 percent dispersions in water and sprayed onto 25 tomato plants previously inoculated with early blight disease (*Alternari solani*). An additional 25 tomato plants growing in the same area and similarly infected with early blight disease are left untreated as controls. Subsequent examination of the treated plants and the untreated controls reveals substantially complete control in the treated plants while most of the untreated control plants developed severe symptoms of the disease.

*Compounds Applied*

1,8-dimethylnaphthalene
1,2-dimethylnaphthalene
1-ethylnaphthalene

EXAMPLE III.—FORMULATION OF A PAINT HAVING ANTI-MILDEW PROPERTIES

The following ingredients are blended and ground together in the indicated proportions in a ball mill.

| Ingredient: | Pounds per 100 gallons |
|---|---|
| Gum rosin, grade W.W. | 277. |
| Blown fish oil | 118. |
| Zinc stearate | 18. |
| 1,8-dimethylnaphthalene | 197. |
| Zinc oxide | 161. |
| Magnesium silicate | 56. |
| Solvent naphtha | [1] 241 approx. |
| Lampblack. | |

[1] Volume adjusted to 100 gals. by the addition of naphtha.

EXAMPLE IV.—ANTI-MILDEW PAINT FORMULATIONS

The formulation of Example III is repeated except that the 1,8-diethylnaphthalene is the inhibitor used.

EXAMPLE V.—ANOTHER FORMULATION OF PAINT RESISTANT TO MILDEW

The following ingredients are blended together in the indicated proportions in a ball mill.

| Ingredient: | Pounds per 100 gallons |
|---|---|
| Rosin | 265. |
| Coal tar | 80. |
| Talc | 80. |
| Pine oil | 42. |
| 1,2-dimethylnaphthalene | 200. |
| High flash naptha and mineral spirits | Made up to 100 gals. volume. |

EXAMPLE VI.—ANTI-MILDEW PAINT FORMULATIONS

The formulation from Example V is used except that 1-ethylnaphthalene is used as the inhibitor.

EXAMPLE VII.—ANTI-MILDEW PAINT FORMULATIONS

The formulation from Example V is used except that the inhibitor employed is an unresolved isomer mixture containing among other dimethylnaphthalenes, 47% 1,8- and 1,2-dimethylnaphthalenes.

EXAMPLE VIII.—PREPARATION OF A VINYL COATING RESISTANT TO MILDEW DETERIORATION

A vinyl coating is prepared using a commercially available preparation without a fungal growth inhibitor.

An identical vinyl coating is prepared except that 1% by weight of 1,8-dimethylnaphthalene is incorporated into the formulation.

Two sets of missile components such as asbestos tubing, silk-wrapped transformers and rayon-wrapped solenoids are obtained. One set is sprayed with the vinyl coating containing inhibitor, the other with the identical coating without inhibitor.

EXAMPLE IX.—PREPARATION OF PLASTICIZERS RESISTANT TO MILDEW

A commercial thermoplastic monomer is divided into four portions which are treated as follows:

*Portion 1.*—To this portion are added 2% by weight of 1,8-dimethylnaphthalene and 10% by weight of dimethylnaphthalate as plasticizer. The monomer is polymerized and molded into a 2-inch diameter disc, ¼ inch in thickness prior to testing.

*Portion 2.*—To this portion are added 2% by weight of 1,2-dimethylnaphthalene and 10% by weight of butyl isodecylphthalate as plasticizer. The monomer is polymerized and molded as above.

*Portion 3.*—This portion is the untreated control of portion 1 containing no fungal inhibitor but 10% by weight of dimethylphthalate as plasticizer. Again the polymerization and molding are identical.

*Portion 4.*—This portion is the untreated control of portion 2 containing no fungal inhibitor but 10% by weight of butyl isodecylphthalate as plasticizer. The polymerization and molding are as described above.

The two plasticizers are chosen on the basis of their known susceptibility to Fusarium attack under high humidity and temperature conditions.

EXAMPLE X.—EVALUATION OF THE PAINT FORMULATIONS, VINYL COATINGS, AND PLASTIZERS FOR MILDEW AND FUNGAL RESISTANCE

A. The paint formulations from Examples III to VII are painted on steel test panels which are allowed to dry and then placed in an air-tight high temperature and humidity chamber maintained at 80° F. and 95% humidity to simulate tropical temperature and humidity conditions. At the same time, steel test panels painted with the untreated control formulations are also placed in the same chamber.

B. The vinyl coated articles of Example VIII, both controls and treated, are placed in an identical heat and humidity chamber kept at the same conditions.

C. The four discs of Example IX made as previously described are placed in a third high temperature and humidity chamber similar to the two described.

*Results*

A. After a one-month test period, the control paint panels are found to be coated with various fungi including Fusarium and Aspergillus species and are discolored. The treated painted panels are unaffected.

B. After a month's exposure the vinyl coated articles treated with inhibitor are only slightly attacked by rot while the articles coated with vinyl without inhibitor are rotted through.

C. After a month of testing the two untreated control discs are examined and are found to be blackened and rotted. Isolates of Aspergillus and Fusarium of unknown species are prepared from the deteriorated discs. The two discs containing fungal inhibitors are not adversely affected.

EXAMPLE XI.—EVALUATION OF INVENTIVE COMPOSITIONS AS MILDEW RETARDANTS IN COTTON

The tests are run under conditions similar to those described in detail in Method 5762, "Mildew Resistance of Cloth; Soil Burial Method," of Federal Specification CCC–T–191, "Textile Test Methods."

Standard "blue-line" cotton duck fabric (3″ x 3″) is impregnated with one percent solutions of the inventive compositions calculated on the dry weight of the fabric. The fabric is cut in three 1″ x 3″ strips which are raveled and buried vertically using spuds. At the same time an identical piece of 3″ x 3″ cotton duck fabric untreated for control purposes, is burned using the same techniques and location. At the end of 5 days' burial, the two groups of buried cotton are removed and tested for loss of breaking strength as compared to unburied controls.

Cloth treated with the following compounds requires at least 50% more force to break than the untreated controls.

1,8-dimethylnaphthalene
1,2-dimethylnaphthalene

We claim:
1. A method of protecting a material subject to attack by fungi, comprising applying to said material a fungi-growth inhibiting amount of an alkylnaphthalene selected from the group consisting of 1,8-dialkylnaphthalene, 1,2-dialkylnaphthalene, 1-ethylnaphthalene and mixtures thereof, said alkyl radicals each having from 1 to 6 carbon atoms.

2. The method of claim 1 wherein the alkylnaphthalene is 1,8-dimethylnaphthalene.

3. The method of claim 1 wherein the alkylnaphthalene is 1,2-dimethylnaphthalene.

4. The method of claim 1 wherein the alkylnaphthalene is 1,8-diethylnaphthalene.

5. The method of claim 1 wherein the alkylnaphthalene is 1-ethylnaphthalene.

6. The method of claim 1 wherein the alkylnaphthalene is a mixture of 1,8- and 1,2-dialkylnaphthalenes.

7. The method of claim 1 wherein the alkylnaphthalene is a mixture of 1,8- and 1,2-dimethylnaphthalenes.

8. A method of protecting plant life from attack by fungi, comprising applying to the locus of said plant life being treated, a fungi-growth inhibiting amount of an alkylnaphthalene selected from the group consisting of the 1,8-dialkylnaphthalene, the 1,2-dialkylnaphthalene, 1-ethylnaphthalene and mixtures thereof, said alkyl radicals each having from 1 to 6 carbon atoms.

9. The method of claim 8 wherein the alkylnaphthalene applied is 1,8-dimethylnaphthalene.

10. The method of claim 8 wherein the alkylnaphthalene applied is 1,2-dimethylnaphthalene.

11. The method of claim 8 wherein the alkylnaphthalene applied is 1-ethylnaphthalene.

12. The method of claim 8 wherein the alkylnaphthalene applied is a mixture of the 1,8- and 1,2-dialkylnaphthalenes.

13. A method of protecting material subject to attack by mildew causative microorganisms, comprising applying to said materials, a growth inhibiting amount of an alkylnaphthalene selected from the group consisting of 1,8-dialkylnaphthalene, 1,2-dialkylnaphthalene, 1-ethylnaphthalene, and mixtures thereof, said alkyl radicals each having from 1 to 6 carbon atoms.

14. The method of claim 13 wherein the alkylnaphthalene applied is 1,8-dimethylnaphthalene.

15. The method of claim 13 wherein the alkylnaphthalene applied is 1,2-dimethylnaphthalene.

16. The method of claim 13 wherein the alkylnaphthalene applied is a mixture of 1,2- and 1,8-dialkylnaphthalene.

17. The method of claim 13 wherein the alkylnaphthalene applied is a mixture of 1,2- and 1,8-dimethylnaphthalene.

18. The method of claim 13 wherein the alkylnaphthalene applied is 1-ethylnaphthalene.

19. A coating composition resistant to attack by mildew causative microorganisms comprising a major amount of inert vehicle, filler, and pigment and a minor amount of an alkylnaphthalene selected from the group consisting of 1,8-dialkylnaphthalene, 1,2-dialkylnaphthalene, 1-ethylnaphthalene, and mixtures thereof, said minor amount of alkylnaphthalene being present in a mildew inhibiting concentration, said alkyl radicals each having from 1 to 6 carbon atoms.

20. A material normally subject to fungal attack having applied thereto a fungi-growth inhibiting amount of an alkylnaphthalene selected from the group consisting of 1,8-dialkylnaphthalene, 1,2-dialkylnaphthalene, 1-ethylnaphthalene, and mixtures thereof, said alkyl radicals each having from 1 to 6 carbon atoms.

References Cited in the file of this patent

UNITED STATES PATENTS 2,347,265    Hyman _____ Apr. 25, 1944

OTHER REFERENCES

Dimond: Conn. Agricultural Experiment Station, Dept. of Plant Pathology and Botony Progress Report, New Haven, Conn., June 22, 1942, pages 1, 2.